United States Patent

[11] 3,620,607

| [72] | Inventor | Raymond H. Griest<br>Los Angeles, Calif. |
|---|---|---|
| [21] | Appl. No | 87,219 |
| [22] | Filed | Nov. 5, 1970 |
| [45] | Patented | Nov. 16, 1971 |
| [73] | Assignee | The United States of America as represented by the Secretary of the Air Force |

[54] VACUUM COMPENSATED MIRROR MOUNT ASSEMBLY
1 Claim, 1 Drawing Fig

[52] U.S. Cl. ............ 350/310, 350/67, 350/288
[51] Int. Cl. ............ G02b 5/08
[50] Field of Search ............ 350/285, 286, 287, 288, 310, 61, 63, 65–67, 70, 96 B

[56] References Cited
UNITED STATES PATENTS

| 3,454,330 | 7/1969 | Smith | 350/287 |
| 3,489,486 | 1/1970 | De La Cierva | 350/286 |

*Primary Examiner*—David Schonberg
*Assistant Examiner*—Michael J. Tokar
*Attorneys*—Harry A. Herbert, Jr. and Arsen Tashjian ABSTRACT: A mirror mount assembly for a laser mirror. The assembly includes bellows, internal of which the mirror is supported. The bellows, and associated components, are mounted on a stable base. The assembly provides for compensation for vacuum forces; accomplishes isolation of the mirror from mechanical vibrations; and permits cooling of the mirror. In addition, the assembly allows ready accessibility to the mirror PATENTED NOV 16 1971
3,620,607
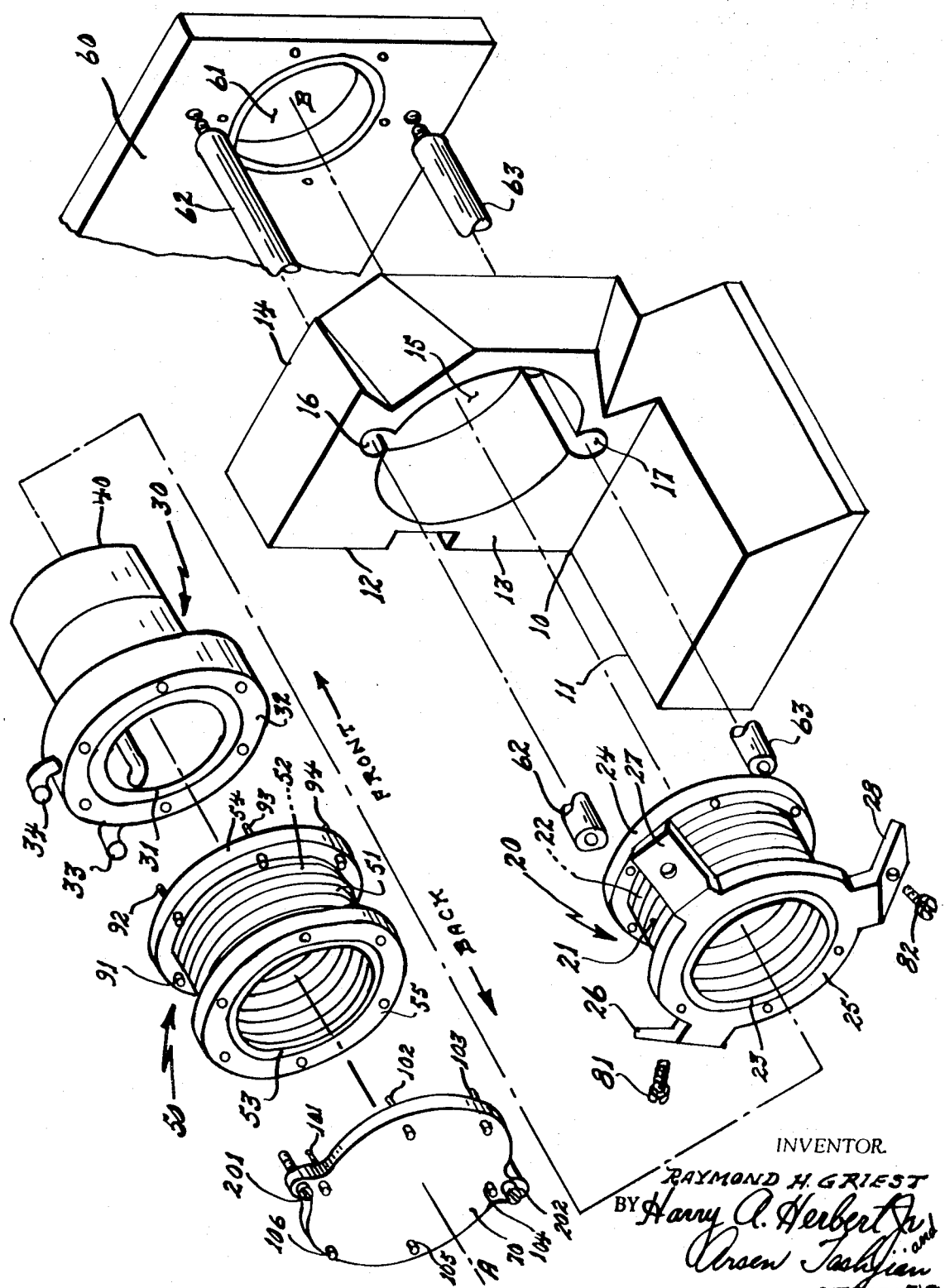
INVENTOR.
RAYMOND H. GRIEST
BY Harry A. Herbert Jr.
Arsen Tashjian
ATTORNEYS

VACUUM COMPENSATED MIRROR MOUNT ASSEMBLY

BACKGROUND OF THE INVENTION

This invention relates to a laser and, more particularly, to a laser mirror.

Certain lasers have very large cavities which, when operating, are maintained under a partial vacuum. It is necessary to mount mirrors, which might be quite large, in the side of the cavity, so as to reflect the laser beam across the cavity. Because of mechanical vibrations and other undesirable reactions, it is necessary to attach the mirrors to an isolated structure which is independent of the cavity, and yet to seal the openings around the mirror against the ingestion of air.

In the prior art attempts were made to maintain a tight seal and sufficient isolation by the use of compliant seals and O-rings. These attempts have proved to be very troublesome, because of the vacuum forces on the mirror and also because of the incomplete isolation afforded by the compliant seals and the O-rings. A further difficulty is that of maintaining the alignment of the mirrors to the required very few arc seconds between the conditions when the mirrors are aligned in the nonoperating case without a vacuum and the operating case with a vacuum.

This invention eliminates these difficulties and disadvantages and, thereby, constitutes a significant advance in the state of the art.

In addition, since in certain large high-power lasers it is necessary to mount large mirrors in such a manner that during operation they are exposed to very high radiant flux densities and, therefore, require cooling, this invention provides means for such cooling by a liquid.

SUMMARY OF THE INVENTION

This invention relates to a laser mirror and, more specifically, to a mirror mount assembly.

An object of this invention is to provide a mirror mount assembly which will maintain alignment of the mirror by allowing compensation for vacuum forces acting on the mirror.

Another object of this invention is to provide a mirror mount assembly which will maintain alignment of the mirror by permitting complete isolation of the mirror from mechanical vibrations.

Still another object of this invention is to provide a mirror mount in which the mirror is readily accessible and, therefore, can be readily adjusted, if necessary.

Yet another object of this invention is to provide means for the liquid cooling of the mirror of the mirror mount assembly.

These objects, and still other and related ones of this invention will become readily apparent after a consideration of the description of the invention and reference to the drawing.

DESCRIPTION OF THE DRAWING

The drawing is an exploded view, in perspective and partly in schematic form, of a preferred embodiment of the invention. In the interest of clarity, the directional designations "Front" and "Back" are labeled as such in the drawing and are in the direction as shown by the arrows.

DESCRIPTION OF THE PREFERRED EMBODIMENT

With reference to the drawing, therein are shown, in an exploded view, the major components of the preferred embodiment of the invention. The components include: base 10; first bellows subassembly 20; mirror support 30 with mirror 40; second bellows subassembly 50; cavity sideplate 60; and sealing plate 70.

Base 10 is stable and has a horizontal portion 11 and a vertical portion 12 with front face 13 and backface 14. Vertical portion 12 has a cylindrical-shaped aperture 15 therethrough and two similar and substantially smaller apertures 16 and 17 also therethrough.

First bellows subassembly 20, i.e. inner bellows, includes: a metal open-ended right-circular first bellows 21 having a front end 22 and a back end 23; a first flange ring 24 affixed to the front end 22 of first bellows 21; and, a second flange ring 25 affixed to back end 23 of first bellows 21 and having tabs, preferably three, such as 26, 27 and 28 circumferentially spaced on second flange ring 25 and extending outwardly therefrom. First flange ring 24 and first bellows 21 pass into and through aperture 15 of base 12 and second flange ring 25 is removably attached to the vertical portion 13 of base 12 by the use of tabs 26, 27 and 28 and suitable bolts, such as 81 and 82, or other appropriate means.

A mirror support 30, with mirror 40 located thereon and removably attached thereto, is positioned to the back (i.e. rearward of) and internal of first bellows 21 by passing it into first bellows 21 through back end 23. A flange ring 32 is affixed to the back end 31 of mirror support 30. Mirror support 30 has means, such as conduits 33 and 34, for conducting a liquid coolant to and from mirror 40.

Second bellows subassembly 50, i.e. outer bellows, includes: a metal open-ended right-circular cylinder second bellows 51 having a front end 52 and a back end 53; a first flange ring 54 affixed to the front end of second bellows 51; and, a second flange ring 55 affixed to back end 53 of second bellows 51. Second bellows subassembly 50 is removably attached, by first flange ring 54 and suitable bolts, such as 91, 92, 93 and 94, or other appropriate means, to flange ring 32 of mirror support 30 and, in turn, to second flange ring 25 of first bellows subassembly 20.

Cavity side plate 60 is disposed to the front of base 10 and has a cylindrical shaped aperture 61 therethrough, around the periphery of which is removably attached first bellows subassembly 20 by first flange ring 24 and suitable bolts (not shown) or other appropriate means. Struts 62 and 63 are in parallel spaced relationship, and are attached at one end to cavity side plate 60, and the other end enters into and passes through, respectively, the smaller apertures 16 and 17 in base 10.

Sealing plate 70 is removably attached, by suitable bolts, such as 101, 102, 103, 104, 105 and 106, or other appropriate means, to second flange ring 55 of second bellows subassembly and by suitable bolts, such as 201 and 202, or other appropriate means, to the other end, i.e. the free end, of struts 62 and 63 of cavity side plate 60.

Also shown in the drawing is longitudinal axis A–B, on which is the optical axis of mirror 40. In this connection, it is to be noted that the longitudinal axes of cavity side plate aperture 61, of base aperture 15, of first bellows subassembly 20, of mirror mount 30, and of second bellows subassembly 50 are coincident and also coincide with axis A–B. Further, the geometric center of sealing plate 70 is on the coincident axis A–B.

MODE OF OPERATION OF THE PREFERRED EMBODIMENT

The mode of operation of the preferred embodiment, as shown in the drawing, can be very easily understood if the disadvantages of the prior art are again noted. As has been previously stated, prior art attempts were made to maintain a tight seal and sufficient isolation by the use of compliant seals and O-rings. These attempts were troublesome at best and unsuccessful at worst. Among other characteristics and properties, the compliant seals and O-rings resulted in canting, tilting and the like, of the mirror when forces acted upon the mirror or the mirror mount, with the result that misalignment of the mirror occurred. A further difficulty was that if the mirror or, more accurately, one of the mirrors became misaligned, the mirrors were not readily accessible and, therefore, could not be readily adjusted.

With reference to the drawing, the embodiment is sufficiently isolated from, and independent of, the cavity that mechanical vibrations do not affect the mirror 40 or mirror mount 30. Additionally, both sides of mirror 40 and mirror mount 30 are exposed to the same vacuum conditions and there will be no uncompensated force tending to displace them. In other words, there will be no longitudinal displacement of bellows 21 and 51 along longitudinal and optical axis A-B, and the mirror will still be aligned. Further, if by some chance, however, improbable, mirror 40 becomes misaligned, the mirror 40 can be readily and easily reached by separating mirror mount 30 from first and second bellows subassemblies 20 and 50, which includes detaching sealing plate 70 from struts 62 and 63.

Also, the embodiment permits cooling of mirror 40 by allowing a liquid coolant to flow through a conduit, one opening of which is 33 and the other of which is 34.

While there has been shown and described the fundamental features of the invention as applied to a preferred embodiment, it is to be understood that various substitutions and omissions may be made by those of ordinary skill in the art without departing from the spirit and scope of the invention.

What is claimed is:

1. A vacuum compensated mirror mount for a laser mirror which requires liquid cooling, comprising:
    a. a base having a horizontal portion and a vertical portion, with said vertical portion having a front face and a back face, and with said vertical portion having a cylindrical shaped aperture therethrough and two similar and substantially smaller apertures also therethrough;
    b. a first bellows subassembly which includes:
       1. an open-ended right-circular cylinder first bellows having a front end and a back end;
       2. a first flange ring affixed to the front end of said first bellows:
       3. and, a second flange ring affixed to the back end of said first bellows, with said second flange ring having three tabs circumferentially spaced thereon and extending outwardly therefrom;
       with said first flange ring and said first bellows passing into and through said cylindrical shaped aperture of said base, and said second flange ring removably attached to said vertical portion of said base by said three tabs of said second flange ring;
    c. a mirror support, with a mirror suitably located thereon, and removably attached thereto, positioned rearward of, and internal of, said open-ended right-circular cylinder first bellows, with said mirror support having a back end to which a flange ring is affixed, and with said mirror support having means for conducting a liquid coolant to and from the mirror;
    d. a second bellows subassembly which includes:
       1. an open-ended right circular cylinder second bellows having a front end and a back end;
       2. a first flange ring affixed to the front end of said second bellows;
       3. and, a second flange ring affixed to the back end of said second bellows;
       with said first flange ring of said second bellows subassembly removably attached to said flange ring of said mirror support;
    e. a cavity side plate disposed to the front of said base, and having a cylindrical shaped aperture therethrough around the periphery of which is removably attached the said first flange ring of said first bellows subassembly, and having two struts in parallel spaced relationship which are attached at one end to said cavity side plate and the other ends of which enter into and pass through said smaller apertures in said base;
    f. a sealing plate removably attached to said second flange ring of said second bellows subassembly and to said other ends of said struts of said cavity plate;
    with the longitudinal axis of said cavity sideplate aperture, of the cylindrical shaped aperture of said base, of said first bellows subassembly, of said mirror mount, and of said second bellows subassembly being coincident and also coinciding with the optical axis of the mirror removably connected to said mirror mount, and with the geometric center of said sealing plate also being on the coincident axis.

* * * * *